May 5, 1959
C. L. BARKER
2,884,891
FLUID FLOW INDICATOR
Filed Aug. 14, 1957
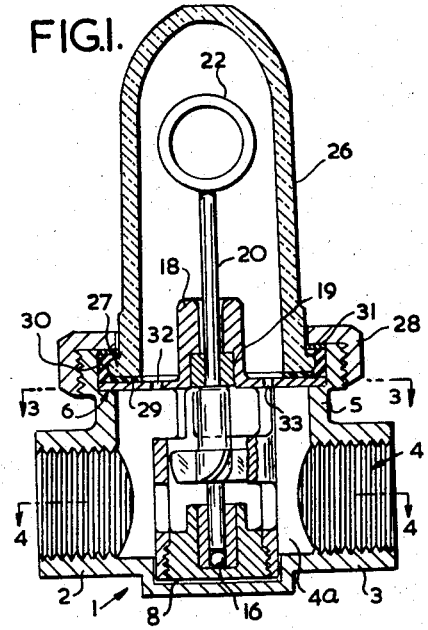
FIG.1.
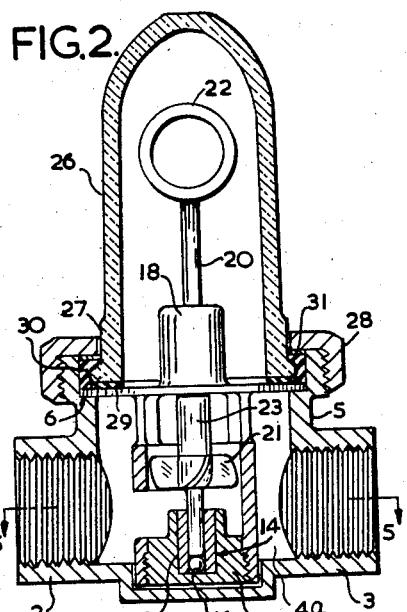
FIG.2.
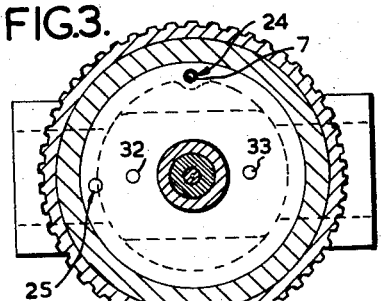
FIG.3.
FIG.4.
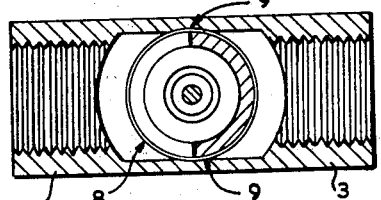
FIG.5.
FIG.6.
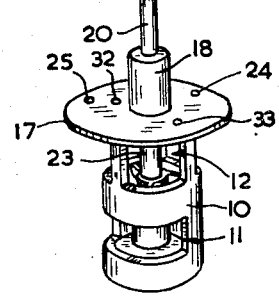
INVENTOR
CLIFFORD L. BARKER
BY United States Patent Office 2,884,891
Patented May 5, 1959

2,884,891

FLUID FLOW INDICATOR

Clifford L. Barker, Cheltenham, England, assignor to Walker, Crosweller & Company Limited, Cheltenham, England Application August 14, 1957, Serial No. 678,064

Claims priority, application Great Britain August 14, 1956

4 Claims. (Cl. 116—117)

This invention has reference to flow indicators of the kind wherein a rotatable spindle is arranged to extend from the interior of a body adapted to be connected in a pipe line, into a transparent dome carried by the said body, the spindle being provided with an impeller which is located within a fluid flow passage extending through the body between an inlet and an outlet so that as fluid flows along the passage it passes over and rotates the impeller, with the result that the spindle is rotated, the rotation being indicated by a ring or equivalent means fitted to the spindle internally of the dome.

Fluid flow indicators of the kind referred to, suffer from the disadvantage that any one indicator is capable of operating only within narrow limits above and below a predetermined rate of flow because, if the said rate decreases to an appreciable extent, the spindle fails to rotate, whereas, if the said rate tends to increase to an appreciable extent, the indicator acts as a choke or restrictor. Consequently, heretofore, it has been the practice to provide a range of indicators of different flow-rate capacities and to connect into a pipe line an indicator selected from the said range and having a flow rate capacity corresponding to that of the pipe line; however, this practice is uneconomical.

The principal object of the present invention is to provide an improved fluid-flow indicator of the kind referred to, of which the flow-rate capacity is adjustable over a wide range.

A further object of the invention is to provide an adjustable unit which is adapted to be incorporated in the body of the indicator so as to enable the flow rate capacity of the said indicator to be varied, and which is also capable of being installed in and removed from the body in a simple and speedy manner so that if it becomes defective it may readily be replaced by another and identical but effective unit without disconnecting the body from the pipe line.

In order that the invention may be readily understood and carried into practice, reference will now be made to the accompanying drawing wherein:

Figure 1 is a sectional elevation of a fluid flow indicator adjusted to operate at a maximum rate of fluid flow, Figure 2 is a similar view to Figure 1, showing the indicator adjusted to operate at a minimum rate of fluid flow, Figure 3 is a section along the line 3—3, Figure 1, Figure 4 is a section along the line 4—4, Figure 1, Figure 5 is a section along the line 5—5, Figure 1, and Figure 6 is a perspective view, on a reduced scale, of an adjustable and removable flow-control valve unit incorporated in the indicator.

The fluid flow indicator shown in the drawings comprises an inverted T-shaped body 1 of which the axially aligned arms 2 and 3 are bored and tapped to provide a straight body passage 4, and to enable the body to be connected into a pipe line, the threaded stem 5 of the body opening at right angles from a passage portion 4a, which has flat and parallel side walls, is located midway between the passage ends, and is of a width greater than the diameter of the passage ends extending through the said arms, but less than the internal diameter of the stem 5.

An annular shoulder 6 is provided internally of the stem above the passage portion 4a and a peg 7 (see Figure 3) projects from the said shoulder laterally of the said portion.

A well 8 in the bottom of the passage portion 4a is of a diameter in excess of the width of the said portion, and two diametrically-opposed concave grooves 9, which are of the same radius as and are concentric to the said well, extend from the bottom to the top of the parallel side walls.

The valve unit shown in Figure 6 comprises a cylindrical shell 10 having an inlet port 11 which extends half way round its periphery, in the vicinity of its lower end, and a system of outlet ports 12 which extends round the entire periphery of its upper end. The said lower end is tapped and closed by a threaded plug 13 which is formed with an axial pocket 14 opening to the interior of the shell; a bearing 15 (see Figures 1 and 2) composed of an anti-friction material such as nylon or polytetrafluorethylene, is provided within the socket, and a ball 16 inserted into the said bearings, rests on the floor of the pocket. The upper end of the shell is closed by an integral disc 17 which is of a diameter equal to the internal diameter of the threaded stem 5 so that it overhangs the shell; an axially bored boss 18 projects from the centre of the disc face remote from the shell, and a bearing 19, composed of the same material as the bearing 15 is provided within the boss.

A spindle 20, which extends axially of the shell through and beyond the boss 18, is journalled in the bearings 15 and 19; the said spindle is provided with a system of impeller blades 21 between the inlet port 11 and the outlet ports 12, its one end seats upon the ball 16, its opposite end is provided with a ring 22 and axial displacement of the spindle relatively to the sleeve is limited by a collar 23 which is integral with the roots of the impeller blades and extends towards, but terminates short of, the bearing 19.

The disc 17 is provided in the vicinity of its periphery, with two holes 24, 25, (see Figure 3) which are spaced apart circumferentially of the disc, by a distance which is a few degrees in excess of a right angle, one or other of the said holes engaging the peg 7 to enable the disc to seat upon the shoulder 6 and prevent rotation of the valve unit within the body 1. The holes 24, 25, are situated in such relationship to the inlet port 11 that, when the hole 24 engages the peg, the port is disposed almost wholly to one side of the longitudinal centre line of the body passage (see Figures 1 and 4) whereas, when the hole 25 engages the said peg, the port is disposed symmetrically of the said centre line and the clearance between the side walls of the passage portion 49 is spanned by the shell half opposite the said port since the external diameter of the shell is greater than the width of the clearance by an amount equal to the sum of the depth of the grooves 9.

The rim of a glass or other transparent dome 26 having an external peripheral lip 27 and enclosing the projecting and ring-supporting end of the spindle, is supported by the disc 17 and is secured within the stem 5 by a tapped locking ring 28 screwed on to and around the said stem, the assembly being rendered fluid tight by a rubber or like resilient washer 29 trapped between the said rim and disc, and a rubber or like resilient annulus 30 interposed and squeezed between the lip 27, the internal periphery of the stem and a metal ring 31 surrounding the dome and trapped between the said lip and the locking ring.

A pair of orifices 32, 33, is formed in the disc 17 to ensure that the pressure within the dome is equal to the pressure within the indicator body.

When connecting the indicator into a pipe line through which fluid is to flow, the arm 2 is connected to the pipe leading from the source of fluid supply and the arm 3 is connected to the pipe leading to the destination of the fluid so that the fluid flows through the indicator from left to right as shown in the drawing. When the expected rate of fluid flow is at a maximum, the hole 24 is engaged with the peg 7 so that the major proportion of the fluid flows straight through the inlet port 11, from the arm 2 to the arm 3, and the remaining minor proportion only is deflected over the impeller blades to rotate the spindle and rejoins the fluid flowing through the arm 3 after passing through the outlet ports 12, such rotation being indicated in a readily visible manner by the rotation of the ring 22 and the speed at which the said ring rotates being an approximate indication of the rate of fluid flow. On the other hand if the expected rate of flow is at a minimum, the valve unit is turned about its axis (after removing the locking nut and dome) to take the hole 25 into engagement with the peg, whereupon, since the passage portion 4a is spanned by the lower unported end of the shell, a considerable proportion of the fluid is directed through the shell over the impeller blades.

Should the valve unit become defective for any reason, it may be removed bodily from the indicator and replaced by a spare and effective unit; consequently, the development of the defect does not necessitate the indicator being rendered inoperative whilst the defect is corrected, nor does it necessitate the disconnection of the indicator body from the pipe line.

If desired, additional peg-engaging holes may be provided in the flange 17 between the holes 24 and 25 so that the valve may be turned to and secured in any one of a corresponding number of intermediate positions to adjust the indicator for ratio of flow between the maximum and minimum. Also if desired, the said holes may be spaced apart by an angular distance which is a few degrees less than a right angle so that the valve unit is adjustable over a corresponding similar angular range.

It is not essential that the cylindrical valve shell should have an external diameter such that it spans the width of the flow passage in the indicator body, or that the length of the shell should be such that the said shell seats in a well in the bottom of the said passage, since, provided the shell end in which the inlet port is formed, depends into the fluid stream flowing through the passage, a proportion of the fluid will flow through the shell between the inlet and outlet ports and over the impeller. Consequently, by providing a threaded adaptor capable of receiving the locking ring and dome and of being fitted into the stem of a standard T-piece of a pipeline, the valve unit may be incorporated in the said T-piece for indicating fluid flow.

What I claim is:

1. A fluid flow indicator for use in a fluid system wherein the ranges of flow rates may vary, comprising an elongate tube defining a longitudinal flow passage therethrough, said tube having a wall defining an opening communicating with the flow passage, a bearing in said tube in alignment with said opening, a spindle journaled in said bearing intersecting the flow passage and extending through the opening, an impeller secured to the spindle and disposed in the flow passage for rotation upon fluid flow, indicator means operatively associated with said spindle for indicating fluid flow, a transparent housing attached to said tube and enclosing said opening and said indicator and the portion of said spindle disposed outside the confines of said tube, and adjustable means disposed within said passage surrounding said impeller and operatively associated therewith for diverting a preselected portion of the fluid flowing through said passage to rotate the impeller, whereby the device is adapted to be used in fluid systems having various flow rates.

2. A fluid flow indicator for use in a fluid system wherein the range of flow rates may vary, comprising an elongate tube defining a longitudinal flow passage through said tube, said tube having a wall defining an opening communicating with the flow passage, a shell disposed in said passage and interrupting flow through said passage, said shell having a bearing therein, a spindle rotatably journaled in said bearing intersecting the flow passage and extending through the opening, said shell having an upper and a lower portion, an aperture defined by the periphery of the upper portion of said shell forming an outlet port, an aperture defined by the periphery of the lower portion of said shell forming an inlet port, an impeller on said spindle surrounded by said shell and disposed intermediate the inlet and outlet ports, indicator means operatively associated with said spindle for indicating fluid flow, a transparent housing attached to said tube and enclosing said opening and said indicator and the portion of said spindle disposed outside the confines of said tube, and means rotatably mounting said shell in said tube so that a preselected area of said inlet port will be aligned with the inlet side of said passage for diverting a preselected portion of fluid flowing therethrough into said shell, whereby fluids having a wide range of flow rates may operate the indicator.

3. The indicator of claim 1 wherein a separating apertured disc is provided in said opening, said spindle being rotatably journaled in said apertured disc, said disc further defining a plurality of orifices so that the pressure in said flow passage and said housing will be equalized.

4. The indicator of claim 2 wherein said outlet port is more than 180 degrees of the periphery of the shell, said inlet port being at least 180 degrees of the periphery of the shell.

References Cited in the file of this patent

UNITED STATES PATENTS

| | | |
|---|---|---|
| 336,136 | Nash | Feb. 16, 1886 |
| 2,328,029 | Porter | Aug. 31, 1943 |
| 2,347,305 | Walker | Apr. 25, 1944 |